Jan. 20, 1959 D. H. JACOBSOHN ET AL 2,869,786

ADDER CIRCUIT

Filed April 17, 1956

INVENTORS
Leslie C. Merrill
and
David H. Jacobsohn

BY Roland A. Anderson
ATTORNEY

United States Patent Office 2,869,786

Patented Jan. 20, 1959

2,869,786

ADDER CIRCUIT

David H. Jacobsohn, Chicago, Ill., and Leslie C. Merrill, Fort Wayne, Ind., assignors to the United States of America as represented by the United States Atomic Energy Commission Application April 17, 1956, Serial No. 578,856

3 Claims. (Cl. 235—61)

Figures 1, 2:
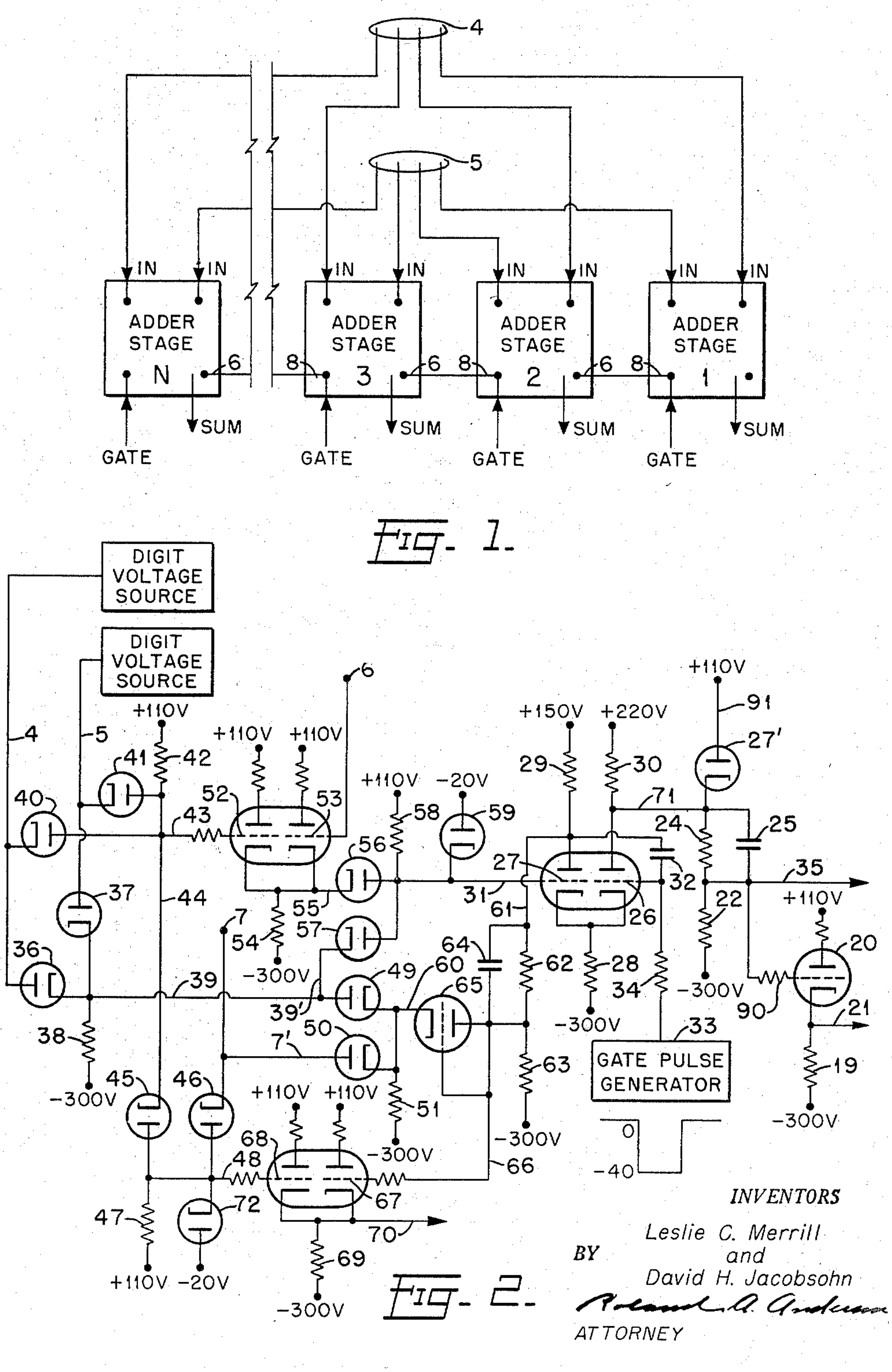

The present invention relates to an improved parallel addition unit especially adapted for use in electronic digital computers, and more especially to a novel multi-stage parallel adder circuit for adding digital numbers in a minimum time interval.

In modern electronic digital computers, the speed of performance of the addition unit of the arithmetic section is an important characteristic of the machine, since it determines to a great extent the time required for solution of a given problem. Much research effort has been devoted to reduction of the time required to perform the basic function of addition within the computer. In serial type adders, the two digits representing the lowest-ordered digits of a number are first added, then the next-lowest-ordered digits are added, and so forth. Such serial adders require only one adder circuit. In parallel type adders, a plurality of adder stages are employed, and corresponding digits of each of two numbers are fed simultaneously to the inputs of the several adder stages. In such adders, means are provided to transfer a carry signal from the lowest-ordered stage through each successive stage to the highest-ordered stage. The carry signal must be propagated through each stage in order, so that each stage may produce the correct unit signal and deliver the correct carry signal to the next highest-ordered stage. A typical carry time for a forty stage parallel adder such as that in the "Ordvac" is 10 to 13 microseconds.

With a knowledge of the desirability of speeding up addition operations in a computing machine, we have as an object of our invention provision of a novel adder circuit characterized by a very rapid carry propagation. Another object of our invention is to provide means for propagating the carry signal through each of a plurality of denominationally-ordered stages in a parallel addition unit within a minimum time interval. A primary object of the invention is to provide a novel addition unit including carry-propagating means, means for conditioning the propagating means and simultaneously impressing the signals to be added on the adder inputs, and gating means for connecting the adder circuit to the propagating means after it is conditioned.

These and other objects of the invention will become apparent from the following detailed description of a preferred embodiment thereof, when read in connection with the appended drawings, wherein:

Figure 1 is a block diagram representing an addition unit constructed according to our invention, and Figure 2 is a schematic diagram of a single adder stage of the unit of Figure 1.

In its broadest aspects, our invention contemplates a fast multi-stage parallel digital adder including a plurality of adder circuits, carry propagation circuit means in all but the most significant digit stage, means for conditioning each carry propagation circuit, preferably during the time period in which information is placed into the adder circuits, and means coupling carry-generation portions of the adder circuit to the carry propagating means. In a preferred embodiment the carry propagation means utilizes unbalanced circuits, that is, bistable circuits arranged so they can change from a first to a second condition extremely rapidly, and from the second to the first condition more slowly, upon receipt of control signals. A conditioning signal is fed in parallel to each stage of the adder to preset each stage in the first condition, so that all changes in the slower direction occur simultaneously, while the number signals are being set up in the adder. Then the adder stages perform the addition function and set the respective "carry" output lines serially as the carries are propagated through the adder, changing the condition of each carry line where no carry is to be propagated and allowing the carry line to remain in its first condition where a carry should occur. The conditioning signal may be a negative rectangular pulse applied to one input of each carry propagation circuit, the other input of which circuit is coupled to the digit adding circuit as described later. Any changes in the carry output lines occur in the direction where operation is very fast. The slower changes all occur at once, in parallel, while any serial changes occur extremely fast.

Referring now to Figure 1, the addition unit may comprise separate stages 1, 2, 3, . . . N connected in parallel in the conventional manner. Each stage is provided with a pair of information inputs 4, 5 for receiving signals representing the two digits to be added, and a carry input 6 connected to the carry output of the next preceding stage. The carry input of stage 1 may be utilized for subtraction, where a "1" is added to the least significant digit. Each stage is provided with a carry output 8 and a sum output. The sum outputs, when read in order, represent the sum of the two numbers added together. Each stage is provided with a gate input for conditioning the carry-propagating means.

Referring now to Figure 2, one stage is shown in detail, including over novel carry propagation scheme as embodied in a circuit which achieves improved operation at substantially increased speed. The propagation means comprises electron tube 26, connected to a source of potential through a large resistor 30 and provided with an output lead 71. Divider network 24, 22, 25 is coupled to lead 71, with carry output lead 35 being taken from the divider and coupled to the input 6 of the next higher-ordered stage. Limiting diode 27' is coupled between the anode of tube 26 and a source of positive potential to restrict the swing of the anode. The cathode follower circuit including tube 20 is provided to furnish an auxiliary carry output 21, connected to the carry input 7 of the adder circuit to provide additional power to drive the diode gates which must be operated by the carry input. The voltage level of outputs 35, 21 is determined by tube 26. Tube 27 and tube 26 have a small common cathode resistor 28 and separate plate resistors 29, 30. The control grid of tube 27 derives its potential from the digit adder circuitry on lead 31, while the grid of tube 26 is coupled to the plate of tube 27 through condenser 32 and is also coupled to the associated carry gate pulse generator 33 through resistor 34.

A preferred form of digit adder may comprise logical "and" and "or" gates so arranged as to produce sum and carry outputs. Diodes 36, 37 and resistor 38 are coupled to a source of negative potential and provided with digit-representing voltages; for example, −15 volts may represent 0 while +10 volts represents 1. The output from this circuit may be taken on lead 39. Diodes 40, 41 and resistance 42, connected to a source of positive potential, form an "and" gate which produces an output on leads 43, 44. Diodes 45, 46 and resistance 47, connected to a source of positive potential, form an "and" gate having an output on lead 48 and provided with diode clamp 72. The carry input on leads 7, 7' and the output on lead 39 are combined in an "or" gate including diodes 49, 50 and resistance 51, coupled to a source of negative potential, and having an output lead 60. The carry input 6 and the output from lead 43 are combined in an "or" gate comprising tubes 52, 53, coupled by means of a common cathode resistor 54, and producing an output on lead 55. This output is taken to an "and" gate including diodes 56, 57 and resistance 58, coupled to a source of positive potential, and provided with an output on lead 31. This output is clamped to a source of reference potential by diode 59. The output on lead 60 is combined with a signal from the anode of tube 27 on lead 61 in an "and" gate including resistances 62, 63 coupled to a source of negative potential, condenser 64, and diode-connected tube 65. An output is provided on lead 66 and is coupled to one tube grid in the "or" gate, including tubes 67, 68 coupled by common cathode resistance 69. The sum output is taken on lead 70.

In operation of the circuit shown, binary signals representing the numbers zero and one are impressed upon inputs 4, 5 simultaneously. The inputs are normally maintained at −15 volts, and for a "zero" input, no change in voltage occurs. But for a "one" signal, the input voltage levels are raised to +10 volts from the external digit voltage sources such as associated registers. The voltage on the lead 31 and at the grid of tube 27 is initially at −15 volts, and that at the grid of tube 26 is initially at 0 volts, so that tube 26 initially conducts and tube 27 is cut off. The voltage on leads 71 and 35 are initially "down," tube 20 is cut off, and the voltage on lead 21 is "down." At the same time as the number signals are being received, a conditioning or "carry gate" signal may be impressed from pulse generator 33 upon the grid of tube 26. This signal may be a rectangular negative pulse, going from 0 to −40 volts. The negative pulse, being coupled directly to the grid of tube 26 through resistor 34, drives the control grid of tube 26 below the −15 volt potential on the grid of tube 27. The common cathode follows to about −40 volts, allowing tube 27 to begin to conduct. The corresponding drop in anode potential across resistor 29 is coupled through condenser 32 to reinforce the negative signal on the grid of tube 26, assuring prompt, complete cut off. Conduction of tube 26 allows its anode potential to rise, increasing the potential on carry output line 35. The potential on the control grid of tube 20 also rises, allowing that tube to conduct, raising the potential of carry output lead 21. The diode clamp 59 assures that lead 31 will not go more negative than the diode return voltage level of −20 volts, so that no matter what signals are applied to inputs 4–7, lead 31 can never go negative enough to override the gate pulse and reverse the carry output signal voltages.

Information received at the inputs of the adder portion of the circuit will then cause various voltages to be set up therethrough, resulting in an output voltage on lead 31 indicative of whether or not a carry should be propagated to the next stage. For example, assume the case where 1 is added to 1 with a carry in from the preceding stage, in which case leads 4–7 each receive a signal of +10 volts. The plate voltage of diodes 40, 41 will follow the lowest cathode voltage, hence leads 43, 44 will be at +10 volts. Since leads 43, 6 are both at +10 volts, tubes 52, 53 will conduct, raising the potential of cathode lead 55 to substantially the +10 volts grid voltage. The voltage on leads 39, 39' tied to the cathodes of diodes 36, 37, will follow the diode plates to +10 volts. The plates of diodes 56, 57 follow their cathodes to +10 volts, causing lead 31 to assume that voltage. Because leads 39, 7' are at +10 volts, the plates and cathodes of diodes 49, 50 are also at that voltage, as is lead 60. Leads 44 and 7 being at +10 volts, then common anode lead 48 for diodes 45, 46 will also assume that voltage.

Since lead 31 is at +10 volts, tube 27 conducts, and the voltage on lead 61 is down to its lower condition. Diode 65 will not conduct, since its cathode is at +10 volts, and lead 66 is therefore at its lower voltage. Tube 67 therefore does not conduct, but tube 68 will conduct because lead 48 is at +10 volts. Lead 70 will assume its higher potential, indicating a "1" sum digit output. Since tube 27 is conducting, its cathode rises to about +10 volts and tube 26 will not conduct because of its lower grid voltage. Lead 71 will therefore be at +220 volts, and lead 35, which is coupled thereto through resistor 24, will assume its higher potential. Cathode follower 20 will conduct and produce an output on lead 21 also at the higher potential, indicating a carry out. The two possible voltages established on lead 31 will be denominated "up" or "down." If lead 31 is up, tube 27 continues to conduct even after the end of the carry gate pulse, since its grid potential is higher than the zero potential of the control grid of tube 26. Therefore tube 26 remains cut off and carry outputs 35, 21 remain in the "carry" condition. But if lead 31 is down at the end of the carry gate pulse tube 26 will begin to conduct, since its grid will be at a higher potential than lead 31, and tube 27 will be cut off. The potential drop across resistor 30 when tube 26 conducts causes a drop in potential on lead 71 so that output lead 35 falls in potential, as does the grid of tube 20, allowing lead 21 also to fall in potential. Detailed operation of the adder is shown in Table I. The voltage on each of the numbered gate output leads shown in the left column is either at its higher (1) level or its lower (0) level for each of the possible combinations of input digits and carries. The eight combinations are shown in the eight columns of the table. The numbers in parentheses to the left of the lead numbers are those of the gate input leads.

A change in the carry output signals in any stage will cause a corresponding change in the voltages set up in the logical adder of the next succeeding stage. Such change may result in actuation of the carry propagation output in that stage. For example, assume the voltages to be established as in the example quoted above where leads 4–7 each received an input of +10 volts. To illustrate the effect on stage $n$ of a change in the carry output of the preceding stage $n-1$, assume that leads 6, 7 revert to −15 volts as the result of a carry collapse (establishment of a "no carry" condition) in stage $n-1$. The decrease in the potential on lead 6 will cut off tube 53, but will not affect the potential of lead 55, because tube 52 continues to conduct due to the +10 volts on lead 43. Lead 31 will remain at +10 volts since both leads 55 and 39' remain at that voltage, so that the carry outputs 21, 35 will not change. The decrease in potential on lead 7 will pull down the plate lead 48 of diode 46 to −15 volts and cut off tube 68. The lower voltage on lead 7' will not affect head 60 through diode 50 because lead 60 follows the higher plate voltage of diode 49. Therefore lead 66 will remain at its lower potential, as determined by lead 61, and tube 67 will remain cut off. Since both tubes 68 and 67 are cut off, the potential of cathode lead 70 will then fall to its lower value, indicating a "0" sum output.

Thus the effect of a carry collapse in any stage $n$ is to change the voltages set up on the carry inputs of the next highest-ordered stage $n+n1$, which change may cause either a carry collapse in stage $n-1$ or a change only in the sum output. To allow for such eventuality, the carry time allowed for adder operation is equal to the time required to set all the outputs in parallel by the carry gating plus N times the time required for actuation of each carry propagation circuit in the fast direction. If N equals 40 stages, for example, 1 microsecond is allowed for carry gating, and .1 microsecond is allowed for carry collapse in each stage, then adder operation would require 1+(40×.1)=5 microseconds per addition. In operations requiring millions of additions per problem, it may be appreciated that the overall saving in computing time made possible by our fast adder is quite significant.

In a preferred form of our circuit arranged for optimum speed of operation, resistor 28 is chosen as small as practicable to stay within the ratings of tube 26, which may be type 6463, for example 18,000 ohms. Resistor 30 is made as large as can be done without making the time for carry build-up too long (above about 1 microsecond), for example 29,000 ohms. Resistor 29 is only 3300 ohms. Tube 26 should have large current handing capacity to provide a large current to discharge the capacitance associated with its plate. Resistors 24, 22 form a divider to provide an output 35 at the proper level for feeding input 6, and should be high enough resistances to force most of the current through tube 26, for example, 82,000 ohms and 175,000 ohms. Condenser 25 may be 100 mmfd., resistor 90 22,000 ohms, and resistor 19 69,000 ohms, for example.

*Table I*

| | Lead Numbers | Possible Voltage Combinations | | | | | | | |
|---|---|---|---|---|---|---|---|---|---|
| (Addend) | 4 | 0 | 0 | 0 | 0 | 1 | 1 | 1 | 1 |
| (Augend) | 5 | 0 | 0 | 1 | 1 | 0 | 0 | 1 | 1 |
| (Carry In) | { 6, 7 } | 0 | 1 | 0 | 1 | 0 | 1 | 0 | 1 |
| (5+4) | 43 | 0 | 0 | 0 | 0 | 0 | 0 | 1 | 1 |
| (43+6) | 55 | 0 | 1 | 0 | 1 | 0 | 1 | 1 | 1 |
| (5+4) | 7′ | 0 | 0 | 1 | 1 | 1 | 1 | 1 | 1 |
| (55+39′) | 31 | 0 | 0 | 0 | 1 | 0 | 1 | 1 | 1 |
| | 39′ | 0 | 1 | 0 | 1 | 0 | 1 | 0 | 1 |
| (39′+7′) | 60 | 0 | 1 | 1 | 1 | 1 | 1 | 1 | 1 |
| (4+5) | 44 | 0 | 0 | 0 | 0 | 0 | 0 | 1 | 1 |
| (44+7) | 48 | 0 | 0 | 0 | 0 | 0 | 0 | 0 | 1 |
| (31+33) | 61 | 1 | 1 | 1 | 0 | 1 | 0 | 0 | 0 |
| (61+60) | 66 | 0 | 1 | 1 | 0 | 1 | 0 | 0 | 1 |
| (Sum Out) | 70 | 0 | 1 | 1 | 0 | 1 | 0 | 0 | 1 |
| | 71 | 0 | 0 | 0 | 1 | 0 | 1 | 1 | 1 |
| | 35 | 0 | 0 | 0 | 1 | 0 | 1 | 1 | 1 |
| (Carry Out) | 21 | 0 | 0 | 0 | 1 | 0 | 1 | 1 | 1 |

It will be apparent further that other conventional or equivalent arrangements of logical nets to derive the sum and carry output voltages may be combined in an addition unit with the carry gating and propagation means herein described without departing from the teachings of our invention, the scope of which is to be defined only by the attached claims.

Having thus described our invention what is claimed as novel is:

1. In an arithmetic unit provided with a plurality of denominationally ordered stages, each stage comprising an adder circuit having addend, augend, and carry inputs and sum and carry outputs for producing binary signals at said outputs corresponding to the sum of the digits represented by binary signals at said inputs, the improvement comprising: a carry propagation circuit associated with each stage save the highest-ordered stage, each said circuit comprising an output coupled to said carry input of the next highest-ordered stage and an input, first and second electron discharge devices provided with first and second cathode, grid, and plate electrodes, respectively, means for energizing said devices, a cathode resistor coupled to both said cathodes, means coupling said second grid to said carry output of the corresponding stage, means coupling said first grid to the plate of said second device, means for applying a gating signal to said first grid to cut off said first tube for a selected interval, means for deriving an output signal from the plate of said first tube, means for applying binary digit signals on said addend and augend inputs to establish carry-determining voltages on respective adder circuit outputs for controlling the carry propagation circuit connected thereto at said second grid, said voltage being such that said first tube conducts at one level and does not conduct at the other level, thereby determining the voltage level and binary character of the output thereof in the absence of said gating signal.

2. The device of claim 1 wherein said carry-propagation circuits are characterized by unbalanced time constants associated with operation of said first tubes such that said tubes are cut off relatively slowly by application of said gating signal but begin conducting rapidly upon receipt of an input signal, said circuits including a voltage supply, a capacitance associated with the plates of said tubes, and respective resistances forming high impedance paths for discharge of said capacitance to said supply and a low impedance path through said tube.

3. In an arithmetic unit provided with a plurality of denominationally ordered stages, each stage comprising an adder circuit having addend, augend, and carry inputs and sum and carry outputs for producing binary signals at said outputs corresponding to the sum of the digits represented by binary signals at said inputs, the improvement comprising: respective bistable circuits in each stage including a first electron tube each stage having cathode, grid, and plate electrodes, cathode, plate and coupling resistors, and a coupling capacitance, said cathode resistor being relatively small and said plate and coupling resistors being relatively large to cause said tube to begin to conduct rapidly but to cut off more slowly upon receipt of an input signal; means for impressing binary digit signals on said addend and augend inputs in each stage to set up binary sum and carry outputs; a second electron tube having an output coupled to said grid and an input coupled to the said carry output; means for simultaneously driving each of said first tubes to the cut off condition by application of a gating pulse irrespective of the output of said second tubes; and means for terminating said pulse to allow respective second tube outputs to determine the operative conditions of the corresponding first tubes; and means coupling respective first tubes to said carry inputs of the next-highest ordered stage.

References Cited in the file of this patent

UNITED STATES PATENTS

| | | |
|---|---|---|
| 2,655,598 | Eckert et al. | Oct. 13, 1953 |
| 2,694,521 | Newman et al. | Nov. 16, 1954 |
| 2,700,504 | Thomas | Jan. 25, 1955 |
| 2,719,670 | Jacobs et al. | Oct. 4, 1955 |
| 2,815,913 | Lucas | Dec. 10, 1957 |